United States Patent

[11] 3,602,075

| [72] | Inventor | Gottlieb Waefler<br>Roches, Switzerland |
|---|---|---|
| [21] | Appl. No. | 814,601 |
| [22] | Filed | Apr. 9, 1969 |
| [45] | Patented | Aug. 31, 1971 |
| [73] | Assignee | Fabrique de machines Andre Bechler S.A.<br>Moutier<br>Canton of Bern, Switzerland |
| [32] | Priority | Apr. 19, 1968 |
| [33] | | Switzerland |
| [31] | | 5842/68 |

[54] ARRANGEMENT ON A "SWISS" AUTOMATIC LATHE FOR FEEDING BAR STOCK
3 Claims, 4 Drawing Figs.

[52] U.S. Cl. .................................................. 82/2.5
[51] Int. Cl. ........................................... B23b 13/02

[50] Field of Search............................................ 82/2-5, 2-7, 912, 913, 38.1

[56] References Cited
UNITED STATES PATENTS
| 3,131,587 | 5/1964 | Spohn et al. ................... | 82/2.7 |
| 3,162,315 | 12/1964 | Holden ....................... | 82/38 X |

FOREIGN PATENTS
| 447,765 | 3/1968 | Switzerland ................ | 82/2.5 |

Primary Examiner—Leonidas Vlachos
Attorney—McNenny, Farrington, Pearne & Gordon

ABSTRACT: A chain driven through a slip clutch by a motor pushes a ram against the bar stock to feed the latter. A member on the chain operates a switch that reduces the r.p.m. of the work spindle until the bar stock has entered a collet of the work spindle.

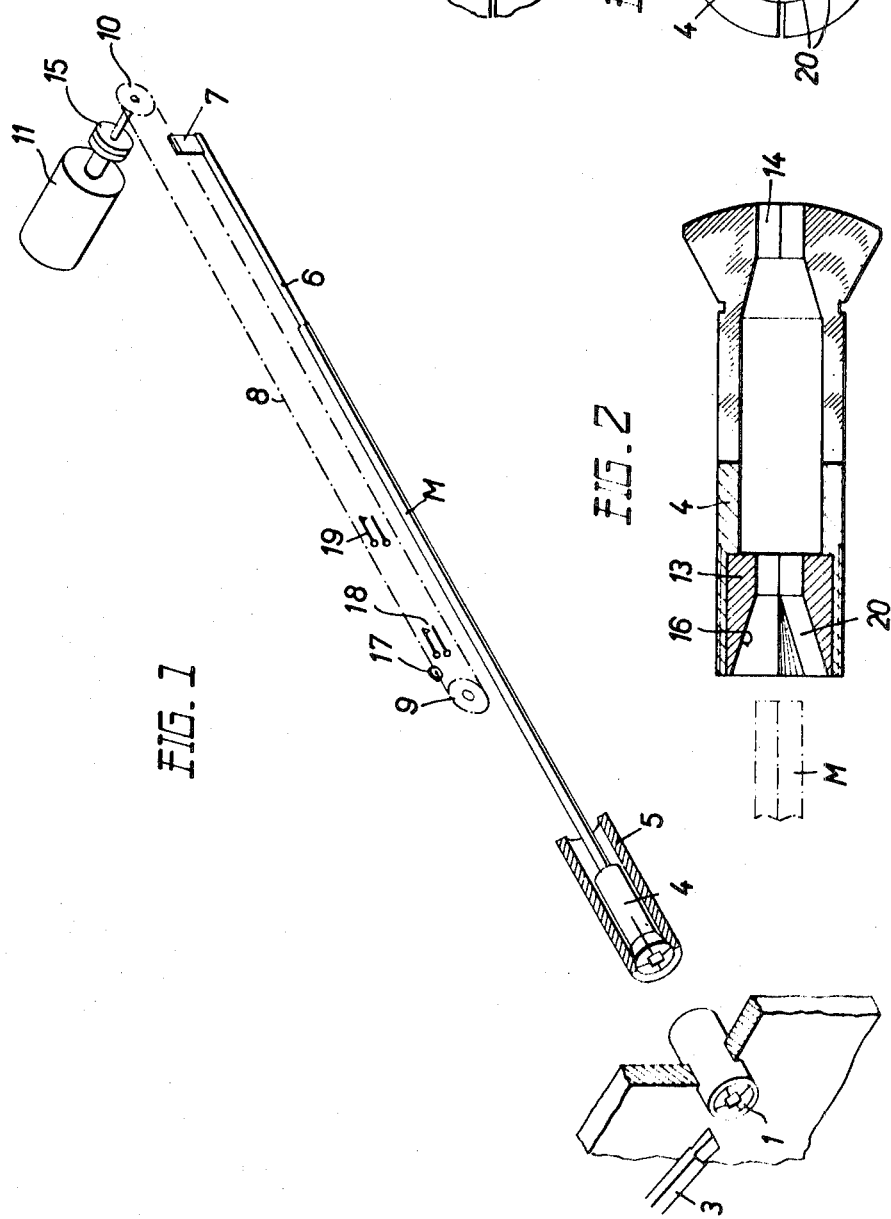

ARRANGEMENT ON A "SWISS" AUTOMATIC LATHE FOR FEEDING BAR STOCK

BACKGROUND OF THE INVENTION

The invention relates to an arrangement on a Swiss-type automatic lathe for feeding bar stock, the "Swiss" automatic (lathe) including a work spindle driven by an electric motor, and a collet for the work spindle, the collet having a polygonal cross section for polygonal bar stock, and the feeding arrangement for the bar stock including a ram, an endless chain fixed to the rear end of the ram, and a motor-driven chain drive wheel for moving the chain to move the ram.

SUMMARY OF THE INVENTION

An object of the invention is so to improve an arrangement of this kind that the difficulties which arise when feeding polygonal bar stock are eliminated.

This object and other of the invention will be apparent from the following detailed description of one embodiment and its modification.

BRIEF DESCRIPTION OF THE DRAWINGS

The invention will be described, with reference to the FIGURES of the accompanying drawing, wherein:

FIG. 1 is a schematic perspective view of the arrangement of the invention;

FIG. 2 is a longitudinal section of the collet;

FIG. 3 is an end-on view of the collet; and

FIG. 4 is an end-on view showing a modification of the collet.

DESCRIPTION OF THE PREFERRED EMBODIMENT AND ITS MODIFICATION

A guide sleeve 1 for the bar stock M is rotatably mounted in a support 2. The sleeve is positioned in a Swiss-type automatic lathe immediately behind a cutting tool 3 and in front of a collet 4, which is arranged in one end of a work spindle 5 of the headstock. The electric motor drive for the work spindle is not shown.

The bar stock M is fed by an arrangement of known construction, having a ram 6 the rear end of which carries a flag 7 that is coupled to the lower strand of an endless chain 8, which runs over a guide wheel 9 and a drive wheel 10. An electric motor 11 turns the drive wheel in either direction.

If the bar stock M is polygonal (square or hexagonal, for example) in cross section, the guide sleeve 1, the guide bore 12 of an insert 13 for the collet 4, and the clamping bore 14 of the collet 4 are provided with a correspondingly polygonal cross section. If, as shown in FIG. 4, the cross section of the bar stock is hexagonal, each of the bores 12 and 14 can be triangular in cross section.

If the bar stock, which is not yet rotating, attempts to enter the bore 12 while it is being fed by the ram 6, difficulties will arise unless particular measures are taken.

A slip clutch 15 arranged between the drive motor 11 and the driven chain wheel 10 ensures that the bar stock M, the ram 6, and the chain 8 are not excessively stressed and subjected to forces corresponding to the full torque of the motor 11 at that time when the front end of the bar stock is fed into the insert opening 16 that narrows towards the bore 12 of the insert 13. A further measure consists in turning the work spindle 5 and the collet 4 at an r.p.m. much lower than the full working r.p.m., at least during this time. To this end, a switch-operating member 17 is fixed to the upper strand of the chain 8 and operates two stationary switches 18 and 19, which control the power of the work spindle motor, so that, for example, from shortly before the front end of the bar stock begins to enter the collet insert 13 and at the longest until this stock end is in position next to the cutting tool 3 the work spindle turns at a substantially reduced r.p.m.

With the same reduced r.p.m. and force applied to the ram 6, the bar stock, in certain circumstances, can be even more gently introduced into the insert bore 12 by providing cut conically shaped recesses 20 in the sides of the insert opening 16, as illustrated in FIGS. 2 and 3.

The switch 19, which is operated by the member 17 when the bar stock has been fed to a predetermined end position, can be used to set into rotation the cam shaft of the Swiss automatic and to operate an additional switch (not shown) for reversing the motor 11 to return the ram 6. Another switch (not shown) can shut off the motor 11 when the ram at the end of its return has reached a predetermined position.

Although the preferred embodiment (and its modification) of the invention has been described, the scope of, and the breadth of protection afforded to, the invention are limited solely by the appended claims.

What is claimed is:

1. A bar feed having an automatic lathe including a work spindle and electrical motor drive operably arranged to rotatably drive said spindle at at least two different speeds, a collet mounted on said spindle, said collet having a bore therethrough of polygonal cross-sectional shape arranged to releasably grip bar stock of similar cross-sectional shape, said bar feed including a ram engageable with a polygonal bar to feed the same through the spindle and collet, said ram including a rear end portion on the end remote from said bar, an endless chain mounted on a pair of sprockets whereby the chain is arranged to move about said sprockets over a portion of a path parallel to said ram, means securing said chain to said rear end of said ram, a drive motor operable for rotating one of said sprockets to move said chain and hence apply a force to said ram urging said bar toward said collet, a slip clutch interconnecting said motor and said one sprocket to permit continued operation of said motor without movement of said ram while applying a force thereto urging said bar into said collet, a switch operably connected to operate said electric motor drive at a low speed and a member on said chain operable to actuate said switch and hence said electric motor drive at said low speed, said member being positioned on said chain at a point where said switch is operated upon forward movement of said ram and bar when said bar enters said collet whereby the rotation of said spindle at said low speed facilitates the alignment of said polygonal bar into alignment with said polygonal bore in said collet.

2. A bar feed as set forth in claim 1 including a second switch operable by said member to said chain to operate said electric motor drive at a higher operating speed after said ram has advanced said bar to a predetermined position in said collet.

3. A bar feed as set forth in claim 1, wherein said collet includes gripping jaws and an insert spaced rearwardly from said gripping jaws, said insert having a first bore position of polygonal shape corresponding to the shape of said bar and a second portion expanding rearwardly and outwardly away from said first portion and a plurality of conical recesses in said second portion for facilitating the introduction of the bar into said collet.